(12) United States Patent
Angra et al.

(10) Patent No.: US 8,785,096 B1
(45) Date of Patent: Jul. 22, 2014

(54) TONER ADDITIVES

(71) Applicant: Xerox Corporation, Norwalk, CT (US)

(72) Inventors: Padam K. Angra, Pittsford, NY (US); Richard P. Veregin, Mississauga, CA (US)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 13/745,535

(22) Filed: Jan. 18, 2013

(51) Int. Cl.
  *G03G 9/08* (2006.01)
  *G03G 9/097* (2006.01)
(52) U.S. Cl.
  CPC .......... *G03G 9/0819* (2013.01); *G03G 9/09725* (2013.01); *G03G 9/097* (2013.01)
  USPC .................................... 430/108.7
(58) Field of Classification Search
  CPC .. G03G 9/09725; G03G 9/0819; G03G 9/097
  USPC .................................... 430/108.7
  See application file for complete search history.

(56) References Cited

U.S. PATENT DOCUMENTS

| | | |
|---|---|---|
| 4,295,990 A | 10/1981 | Verbeek et al. |
| 4,457,998 A | 7/1984 | Gruber et al. |
| 4,935,326 A | 6/1990 | Creatura et al. |
| 4,937,166 A | 6/1990 | Creatura et al. |
| 5,290,654 A | 3/1994 | Sacripante et al. |
| 5,302,486 A | 4/1994 | Patel et al. |
| 5,556,732 A | 9/1996 | Chow |
| 6,042,981 A | 3/2000 | Barbetta et al. |
| 6,063,827 A | 5/2000 | Sacripante et al. |
| 6,355,391 B1 | 3/2002 | Van Dusen et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 7,014,971 B2 | 3/2006 | Skorokhod et al. |
| 7,485,400 B2 | 2/2009 | Veregin et al. |
| 7,524,602 B2 | 4/2009 | Vanbesien et al. |

OTHER PUBLICATIONS

Chuanbo Gao, Zhenda Lu and Yadong Yin: Title: Gram-Scale Synthesis of Silica Nanotubes with Controlled Aspect Ratios by Templating of Nickel-Hydrazine Complex Nanorods; pp. 12201-12208; Langmuir Article, 2011.
Jung-Keun Yoo, Jongsoon Kim, Yeon Sik Jung and Kisuk Kang: Title: Scalable Fabrication of Silicon Nanotubes and their Application to Energy Storage; pp. 5452-5456; Wiley-VCH Verlag GmbH & Co. KGaA, Weinheim, 2012.
Dong Li, Xuewei Qu, Salete M.C. Newton, Philip E. Klebba and Chuanbin Mao: Title: Morphology-controlled synthesis of Silica Nanotubes through pH—and Sequence-responsive Morphological Change of Bacterial Flagellar Biotemplates; pp. 15702-15709; The Royal Society of Chemistry, 2012.
Yang-Wen Chen, Yuan-Hong Tang, Li-Zhai Pei and Chi Guo: Self-Assembled Silicon Nanotubes Grown fro Silicon Monoxide; pp. 564-567; Wiley-VCH Verlag GmbH & Co. KGaA, Weinheim, Mar. 8, 2005.

*Primary Examiner* — Mark A Chapman
(74) *Attorney, Agent, or Firm* — Pillsbury Winthrop Shaw Pittman LLP

(57) ABSTRACT

The disclosure relates generally to toner additives, and in particular, toner additives that provide desired higher and stable toner charge. The toner additives comprise silica nanotubes in combination with or in place of the commonly used silica or titania particulate additives.

20 Claims, No Drawings

TONER ADDITIVES

BACKGROUND

The disclosure relates generally to toner additives, and in particular, toner additives that provide desired higher and stable toner charge. The toner additives comprise silica nanotubes in combination with or in place of or in combination with the commonly used toner additives, such as silica ($SiO_2$).

Toners can comprise at least a binder resin, a colorant and one or more external surface additives. Any resin binder suitable for use in toner preparation may be employed without limitation. The external surface additives can be added in small amounts. Examples of external surface additives include, for example, silica, titanium dioxide, zinc stearate and the like. The properties of a toner are influenced by the materials and amounts of the materials of the toner. The charging characteristics of a toner also can depend on the carrier used in a developer composition, such as, the carrier coating.

Toners having triboelectric charge within the range of about $-30\,\mu C/g$ to about $-45\,\mu C/g$ may be achieved by including smaller-sized silica particles as external additives, for example silica particles having average sizes of less than about 20 nm, such as, for example, R805 (~12 nm) and/or R972 (~16 nm) (Evonik, N.J.). However, developability at areas of low toner area coverage degrades over time. That has been attributed to the smaller-sized additives being impacted into the toner surface over time. The problem with smaller-sized additives may be addressed by using larger-sized additives, i.e., additives having a size of about 40 nm or larger such as, for example, RX50 silica, RX515H silica or SMT5103 titania (Evonik, N.J.). However, such toners do not exhibit as high a triboelectric charge and also exhibit charge through.

Surface additives also suffer from high additive impaction due to the small primary particle size of 7 to 160 nm. While impaction can be reduced by using larger particle sizes, the larger particle sizes cause the additive to be less adhered to the toner surface which can lead to contamination of other surfaces, such as the photoreceptor and BCR. For example, due to its small size, silica gets embedded into toner surface under low throughput or high toner age conditions and loses its effectiveness which causes loss of developability and transfer efficiency. Larger size spacer additives can be used to shield small size silica from impacting into the toner surface, however, these larger size additives add unnecessary cost and also attach poorly to the toner surface and contaminate the developer material, developer housing, charging devices, photoreceptor, transfer devices, and fuser components.

Thus, there is a need for new surface additives that can provide high and stable toner charge, and reduced additive impaction with improved adhesion of the additive to the toner surface without the use of larger size spacer additives.

SUMMARY

The present embodiments provide a toner composition comprising: a toner composition comprising: toner particles comprising a resin and a colorant; and one or more surface additives applied to a surface of the toner particles, the one or more surface additives comprising silica nanotubes.

In specific embodiments, there is provided a toner composition comprising: a toner composition comprising: toner particles comprising a resin and a colorant; and one or more surface additives applied to a surface of the toner particles, the one or more surface additives comprising silica nanotubes, wherein the toner composition has a high charge of from about $-15$ microcoulomb per gram to about $-80$ microcoulomb per gram and a low relative humidity sensitivity ratio of from about 1 to about 2.

In yet other embodiments, there is provided a developer comprising: a developer comprising: a toner composition; and a toner carrier, wherein the toner composition comprises toner particles comprising a resin and a colorant, and one or more surface additives applied to a surface of the toner particles, the one or more surface additives comprising silica nanotubes.

DETAILED DESCRIPTION

The disclosure relates toner additives that provide desired higher and stable toner charge. The toner additives comprise silica nanotubes (SiNTs) in place of or in combination with the commonly used silica ($SiO_2$) toner additives. These novel additives have a unique shape that allows them to provide charge control, flow aid and transfer aid to the toner. SiNTs have a narrow cylindrical structure that allows them to act like small particles in one dimension and adhere strongly to the toner surface, thereby reducing contamination of various xerographic equipment components. The longer dimension of these SiNTs further allow them to act like large particles offering lower or no impaction into the toner surface under low throughput or high toner age conditions, thus delivering more consistent developability and transfer efficiency without the need for larger size spacer additives.

Particulate titania and silica are the two commonly used xerographic toner surface additives. Silica is non-crystalline and has desirable properties of high charge, but suffers from high RH sensitivity, in part because of the high water adsorption of the silica hydroxyl groups. While silica is amorphous, titania has two tetragonal structures, anatase and rutile (i.e., cubic structures that are stretched in one crystalline direction), both characterized by a predominant [101] face. These structures of the conventional additives are generally comprised of spherical particles or clumps of spherical particles, while some conventional rutile particulate additives can be comprised of isolated or bundles of acicular shaped crystals.

Particulate titania also is characterized by the [101] face being heavily covered by surface hydroxyl groups. Titania provides lower charge, but also improved RH sensitivity as compared to silica, although titania also has significant RH sensitivity. To address these problems, it has been common in toner developer designs to add both a titania and a silica to get a reasonable compromise for charge and RH sensitivity. However, even this solution has its problems. For example, the inclusion of silica makes it difficult to achieve an RH sensitivity that is anywhere close to the desired value of 1. However, without the silica the charge is too low.

Surface additives also suffer from high additive impaction due to the small primary particle size of 7 to 160 nm. While impaction can be reduced by using larger particle sizes, the larger particle sizes cause the additive to be less adhered to the toner surface which can lead to contamination of other surfaces, such as the photoreceptor and BCR. Thus, primary particles of 7 nm are most sensitive to impaction, while those of 150 nm are least sensitive to impaction but most likely to be lost from the toner particle.

Toner Additives.

The present embodiments address the problems faced by conventionally used toner additives. The present embodiments provide silica nanotubes as a toner additive. In embodiments, the silica nanotubes may comprise a material selected from the group consisting of silicon, oxygen, silicone monoxide, silicone dioxide and mixtures thereof. As briefly explained above, these silica nanotubes have a unique shape that allows them to provide charge control, flow aid and transfer aid to the toner. In particular, SiNTs have a narrow cylindrical structure that allows them to act like small particles in one dimension and adhere strongly to the toner surface, thereby reducing contamination of various xerographic equipment components. However, the longer dimension of these SiNTs further allow them to act like large particles offering lower or no impaction into the toner surface under low throughput or high toner age conditions, thus delivering more consistent developability and transfer efficiency without the need for larger size spacer additives.

SiNTs can be produced in different morphologies using several methods. One such method is described by Dong Li et al, Morphology-controlled synthesis of silica nanotubes through pH- and sequence-responsive morphological change of bacterial flagellar biotemplates, J. Mater. Chem., 22: 15702 (2012). In another reported synthesis, silica nanotubes of controlled morphology were prepared by templated synthesis with nickel hydride (Chuanbo Gao et al., Gram-Scale Synthesis of Silica Nanotubes with Controlled Aspect Ratios by Templating of Nickel-Hydrazine Complex Nanorods, Langmuir, 27: 12201-12208 (2011)). Sizes reported were lengths of 37 to 340 nm and diameters less than 50 nm. In another reported synthesis, it was shown that SiNTs could be prepared directly via hydrothermal synthesis, using silicon monoxide in water and no catalyst (Y. W. Chen et al., Self-Assembled Silicon Nanotubes Grown from Silicon Monoxide, Adv. Mater. 17: 564 (2005)). Based on a high-resolution transmission electron microscope (TEM) micrograph of the obtained nanotubes they are shown to be multi-walled with a 13 nm diameter, the interior is a silicon nanotube, but the exterior layer is silica. If desired, the silica could be removed by hydrofluoric (HF) acid treatment to give a smaller silicon nanotube. These attributes make SiNTs an excellent candidate as toner additives.

Another benefit of the present nanotubes is the increased adhesion of the silica nanotubes to the toner surface which makes it less likely to cause contamination of other xerographic subsystems such as the photoreceptor or bias charge roller (BCR). How well the SiNTs will adhere to the surface of the toner will depend mostly on their size and aspect ratio. The pull off force for an additive is proportional to its mass (F=ma), while the adhesion force is proportional to the area in contact and the nature of the chemical interaction—in the absence of specific chemical bonds, the latter will simply be the van der Waal's forces which do not vary very much with material composition. Thus, how well the additive sticks to the surface of the toner will depend mostly on the ratio of the surface area in contact to the mass, for silica additives the surface area to volume, since density is the same for all. Thus, for example, a nanotube of 12 nm diameter and 500 nm length as described below has the same surface area/mass ratio as a 17 nm spherical silica particle. As a result, the silica nanotubes adhere to the toner surface like a small silica. Also, since it is a small radius in one dimension, in terms of properties like toner flow a nanotube acts like a small particle, and thus provides better flow (as cohesion is proportional to the particle radius) than a large particle. However, in terms of additive impaction, the area in contact for a nanotube is equivalent to that of a larger particle. Thus it is more difficult to impact the nanotubes. Thus, for impaction, the silica nanotubes above are the equivalent of a 55 nm spherical silica. As the nanotube becomes longer these effects increase. The overall effect is that for charge, flow and adhesion to the toner, nanotubes are expected to act desirably like small particles, but also desirably as large particles for impaction.

In the present embodiments, the toner with silica nanotubes has excellent toner flow. Toner flow can be measured as described in U.S. Pat. No. 7,485,400, which is hereby incorporated by reference in its entirety, providing a cohesion of from about 10% to about 40%, or from about 20% to about 70%, or from about 10% to 78%.

In the present embodiments, the toner with silica nanotubes may provide high adhesion of the nanotubes to the toner particle, so that the silica nanotubes remain on the toner particle during the print process. The adhesion of the silica nanotubes to the toner particle can be measured as described in U.S. Pat. No. 7,485,400, which is hereby incorporated by reference in its entirety, providing an Additive Adhesion Force Distribution (AAFD) percent value of greater than about 40% at energy of sonification of 12 kilojoules of energy, at from about 10 to 12 minutes of sonification. In embodiments, the AAFD can have a value of greater than about 40% at 6 kilojoules of energy, at from about 5 to 6 minutes of sonification, and in further embodiments, the AAFD can have a value of 40% at 3 kilojoules of energy, at from about 2.5 to 3 minutes of sonification.

In embodiments, the toner made from the present embodiments maintains a high charge of from about −15 to about −80 microcoulombs/gram or from about −20 to about −70 microcoulombs/gram or from about −20 to about −60 microcoulombs/gram.

In the present embodiments, there is provided a toner composition comprising silica nanotubes. The toners may be prepared by chemical methods (emulsion/aggregation) and physical methods (grinding), both of which may be equally employed. Thus, the toner may be any conventional toner. In specific embodiments, the toner may also be an emulsion aggregate toner. In embodiments, these silica nanotubes are included on the toner surface as toner surface additives. The silica nanotubes are included in place of or in combination with other conventional toner surface additives, such as for example, particulate silica or titania.

As described above, the nanotubes have structures that may be cylindrical—spherical in one dimension and more linear in other dimensions. In embodiments, the silica nanotubes have an average particle diameter of from about from about 5 nm to about 100 nm, or from about 5 to about 50 nm, or from about 6 to about 20 nm. In embodiments, the silica nanotubes have an average particle length of from about from about 50 nm to about 2 microns, or from about 100 nm to about 1 micron, or from about 150 nm to about 500 nm.

In further embodiments, the silica nanotubes are present in an amount of from about 0.1 to about 5 weight percent, or of from about 0.5 to about 3 weight percent, or of from about 1 to about 4 weight percent by weight of the total weight of the toner particle. In other embodiments, the silica nanotubes are used in combination with the conventional particulate toner surface additives. In such embodiments, the silica nanotubes are present in an amount of from about 0.1 to about 5 weight percent, or of from about 0.5 to about 3 weight percent, or of from about 1 to about 4 weight percent by weight of the total weight of the toner particle while the conventional toner surface additives are present in an amount of from about 0.1 to about 5 weight percent, or of from about 0.5 to about 3 weight percent, or of from about 1 to about 4 weight percent by weight of the total weight of the toner particle. The conventional toner surface additives are selected from the group consisting of $SiO_2$, or metal oxides such as $TiO_2$ and $AlO_2$, and mixtures thereof. The particulate titania may be of anatase or rutile structure. The conventional toner surface additives may be surface treated.

The silica nanotubes may also be surface treated. In embodiments, the silica nanotube are surface treated with compounds including dodecyltrimethoxysilane (DTMS) or hexamethyldisilazane (HMDS). Examples of these additives are silica nanotubes coated with a mixture of HMDS and aminopropyltriethoxysilane, silica nanotubes coated with PDMS (polydimethylsiloxane), silica nanotubes coated with octamethylcyclotetrasiloxane, silica nanotubes coated with dimethyldichlorosi lane, DTMS silica nanotubes comprising a silica nanotubes core coated with DTMS, and silica nanotubes coated with an amino functionalized organ opolysiloxane.

Emulsion Aggregation Toner

In embodiments, a developer is disclosed including a resin coated carrier and a toner, where the toner may be an emulsion aggregation toner, containing, but not limited to, a latex resin, a wax and a polymer shell.

In embodiments, the latex resin may be composed of a first and a second monomer composition. Any suitable monomer or mixture of monomers may be selected to prepare the first monomer composition and the second monomer composition. The selection of monomer or mixture of monomers for the first monomer composition is independent of that for the second monomer composition and vise versa. Exemplary monomers for the first and/or the second monomer compositions include, but are not limited to, polyesters, styrene, alkyl acrylate, such as, methyl acrylate, ethyl acrylate, butyl arylate, isobutyl acrylate, dodecyl acrylate, n-octyl acrylate, 2-chloroethyl acrylate; β-carboxy ethyl acrylate (β-CEA), phenyl acrylate, methyl alphachloroacrylate, methyl methacrylate, ethyl methacrylate and butyl methacrylate; butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; methacrylate; acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof. In case a mixture of monomers is used, typically the latex polymer will be a copolymer.

In some embodiments, the first monomer composition and the second monomer composition may independently of each other comprise two or three or more different monomers. The latex polymer therefore can comprise a copolymer. Illustrative examples of such a latex copolymer includes poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), polystyrene-butyl acrylate-acrylononitrile), and the like.

In embodiments, the first monomer composition and the second monomer composition may be substantially water insoluble, such as, hydrophobic, and may be dispersed in an aqueous phase with adequate stirring when added to a reaction vessel.

The weight ratio between the first monomer composition and the second monomer composition may be in the range of from about 0.1:99.9 to about 50:50, including from about 0.5:99.5 to about 25:75, from about 1:99 to about 10:90.

In embodiments, the first monomer composition and the second monomer composition can be the same. Examples of the first/second monomer composition may be a mixture comprising styrene and alkyl acrylate, such as, a mixture comprising styrene, n-butyl acrylate and β-CEA. Based on total weight of the monomers, styrene may be present in an amount from about 1% to about 99%, from about 50% to about 95%, from about 70% to about 90%, although may be present in greater or lesser amounts; alkyl acrylate, such as, n-butyl acrylate, may be present in an amount from about 1% to about 99%, from about 5% to about 50%, from about 10% to about 30%, although may be present in greater or lesser amounts.

In embodiments, the resins may be a polyester resin, such as, an amorphous resin, a crystalline resin, and/or a combination thereof, including the resins described in U.S. Pat. Nos. 6,593,049 and 6,756,176, the disclosure of each of which hereby is incorporated by reference in entirety. Suitable resins may also include a mixture of an amorphous polyester resin and a crystalline polyester resin as described in U.S. Pat. No. 6,830,860, the disclosure of which is hereby incorporated by reference in entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol may be, for example, selected in an amount of from about 40 to about 60 mole percent, in embodiments from about 42 to about 55 mole percent, in embodiments from about 45 to about 53 mole percent (although amounts outside of these ranges can be used), and the alkali sulfo-aliphatic diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate- 4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfa-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, in embodiments from about 40 to about 60 mole percent, in embodiments from about 42 to about 52 mole percent, in embodiments from about 45 to about 50 mole percent, and the alkali sulfa-aliphatic diacid can be selected in an amount of from about 1 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sillfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly (ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 50 percent by weight of the toner components, in embodiments from about 10 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthafic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 52 mole percent of the resin, in embodiments from about 45 to about 50 mole percent of the resin. Examples of the alkylene oxide adducts of bisphenol include polyoxypropylene (2.2)-2,2-bis(4-hydroxyphenyl) propane, polyoxypropylene (3.3)-2,2-bis(4-hydroxyphenyl) propane, polyoxyethylene (2.0)-2,2-bis(4-hydroxyphenyl) propane, polyoxyethylene (2.2)-2,2-bis(4-hydroxyphenyl) propane, polyoxypropylene (2.0)-polyoxyethylene (2.0)-2,2-bis(4-hydroxyphenyl) propane, and polyoxypropylene (6)-2,2-bis(4-hydroxyphenyl) propane. These compounds may be used singly or as a combination of two or more thereof.

Examples of additional diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, dipropylene glycol, dibutylene, and combinations thereof.

The amount of organic diol selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

Furthermore, in embodiments, a crystalline polyester resin may be contained in the binding resin. The crystalline polyester resin may be synthesized from an acid (dicarboxylic acid) component and an alcohol (diol) component. In what follows, an "acid-derived component" indicates a constituent moiety that was originally an acid component before the synthesis of a polyester resin and an "alcohol-derived component" indicates a constituent moiety that was originally an alcoholic component before the synthesis of the polyester resin.

A "crystalline polyester resin" indicates one that shows not a stepwise endothermic amount variation but a clear endothermic peak in differential scanning calorimetry (DSC). However, a polymer obtained by copolymerizing the crystalline polyester main chain and at least one other component is also called a crystalline polyester if the amount of the other component is 50% by weight or less.

As the acid-derived component, an aliphatic dicarboxylic acid may be utilized, such as a straight chain carboxylic acid. Examples of straight chain carboxylic acids include oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,1-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid, as well as lower alkyl esters and acid anhydrides thereof. Among these, acids having 6 to 10 carbon atoms may be desirable for obtaining suitable crystal melting point and charging properties. In order to improve the crystallinity, the straight chain carboxylic acid may be present in an amount of about 95% by mole or more of the acid component and, in embodiments, more than about 98% by mole of the acid component. Other acids are not particularly restricted, and examples thereof include conventionally known divalent carboxylic acids and dihydric alcohols, for example those described in "Polymer Data Handbook; Basic Edition" (Soc. Polymer Science, Japan Ed.: Baihukan). Specific examples of the monomer components include, as divalent carboxylic acids, dibasic acids such as phthalic acid, isophthalic acid, terephthalic acid, naphthalene-2,6-dicarboxylic acid, naphthalene-2,7-dicarboxylic acid, and cyclohexanedicarboxylic acid, and anhydrides and lower alkyl esters thereof, as well as combinations thereof, and the like. As the acid-derived component, a component such as a dicarboxylic acid-derived component having a sulfonic acid group may also be utilized. The dicarboxylic acid having a sulfonic acid group may be effective for obtaining excellent dispersion of a coloring agent such as a pigment. Furthermore, when a whole resin is emulsified or suspended in water to prepare a toner mother particle, a sulfonic acid group, may enable the resin to be emulsified or suspended without a surfactant. Examples of such dicarboxylic acids having a sulfonic group include, but are not limited to, sodium 2-sulfoterephthalate, sodium 5-sulfoisophthalate and sodium sulfosuccinate. Furthermore, lower alkyl esters and acid anhydrides of such dicarboxylic acids having a sulfonic group, for example, are also usable. Among these, sodium 5-sulfoisophthalate and the like may be desirable in view of the cost. The content of the dicarboxylic acid having a sulfonic acid group may be from about 0.1% by mole to about 2% by mole, in embodiments from about 0.2% by mole to about 1% by mole. When the content is more than about 2% by mole, the charging properties may be deteriorated. Here, "component mol %" or "component mole %" indicates the percentage when the total amount of each of the components (acid-derived component and alcohol-derived component) in the polyester resin is assumed to be 1 unit (mole).

As the alcohol component, aliphatic dialcohols may be used. Examples thereof include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-dodecanediol, 1,12-undecanediol, 1,13-tridecanediol, 1,14-tetradecanediol, 1,18-octadecanediol and 1,20-eicosanediol. Among them, those having from about 6 to about 10 carbon atoms may be used to obtain desirable crystal melting points and charging properties. In order to raise crystallinity, it may be useful to use the straight chain dialcohols in an amount of about 95% by mole or more, in embodiments about 98% by mole or more.

Examples of other dihydric dialcohols which may be utilized include bisphenol A, hydrogenated bisphenol A, bisphenol A ethylene oxide adduct, bisphenol A propylene oxide adduct, 1,4-cyclohexanediol, 1,4-cyclohexanedimethanol, diethylene glycol, propylene glycol, dipropylene glycol, 1,3-butanediol, neopentyl glycol, combinations thereof, and the like.

For adjusting the acid number and hydroxyl number, the following may be used: monovalent acids such as acetic acid and benzoic acid; monohydric alcohols such as cyclohexanol and benzyl alcohol; benzenetricarboxylic acid, naphthalenetricarboxylic acid, and anhydrides and lower alkylesters thereof; trivalent alcohols such as glycerin, trimethylolethane, trimethylolpropane, pentaerythritol, combinations thereof, and the like.

The crystalline polyester resins may be synthesized from a combination of components selected from the above-mentioned monomer components, by using conventional known methods. Exemplary methods include the ester exchange method and the direct polycondensation method, which may be used singularly or in a combination thereof. The molar ratio (acid component/alcohol component) when the acid component and alcohol component are reacted, may vary depending on the reaction conditions. The molar ratio is usually about 1/1 in direct polycondensation. In the ester exchange method, a monomer such as ethylene glycol, neopentyl glycol or cyclohexanedimethanol, which may be distilled away under vacuum, may be used in excess.

Surfactants

Any suitable surfactants may be used for the preparation of the latex and wax dispersions according to the present disclosure. Depending on the emulsion system, any desired nonionic or ionic surfactant such as anionic or cationic surfactant may be contemplated.

Examples of suitable anionic surfactants include, but are not limited to, sodium dodecyl sulfate, sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power®, available from Tayca Corp., DOWFAX®, available from Dow Chemical Co., and the like, as well as mixtures thereof. Anionic surfactants may be employed in any desired or effective amount, for example, at least about 0.01% by weight of total monomers used to prepare the latex polymer, at least about 0.1% by weight of total monomers used to prepare the latex polymer; and no more than about 10% by weight of total monomers used to prepare the latex polymer, no more than about 5% by weight of total monomers used to prepare the latex polymer, although the amount can be outside of those ranges.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$ and $C_{17}$ trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol (available from Rhone-Poulenc as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890®, and ANTAROX 897®) and the like, as well as mixtures thereof.

Initiators

Any suitable initiator or mixture of initiators may be selected in the latex process and the toner process. In embodiments, the initiator is selected from known free radical polymerization initiators. The free radical initiator can be any free radical polymerization initiator capable of initiating a free radical polymerization process and mixtures thereof, such free radical initiator being capable of providing free radical species on heating to above about 30° C.

Although water soluble free radical initiators are used in emulsion polymerization reactions, other free radical initiators also can be used. Examples of suitable free radical initiators include, but are not limited to, peroxides, such as, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, diisopropyl peroxycarbonate, tetralin hydroperoxide, 1-phenyl-2-methylpropyl-1-hydroperoxide and tert-butylhydroperoxide; pertriphenylacetate, tert-butyl performate; tert-butyl peracetate; tert-butyl perbenzoate; tert-butyl perphenylacetate; tert-butyl permethoxyacetate; tert-butyl per-N-(3-toluoyl)carbamate; sodium persulfate; potassium persulfate, azo compounds, such as, 2,T-azobispropane, 2,2'-dichloro-2,2'-azobispropane, 1,1'-azo(methylethyl)diacetate, 2,2'-azobis (2-amidinopropane)hydrochloride, 2,2'-azobis(2-amidinopropane)-nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol A-4,4'-azobis-4-cyanopentano-ate) and poly(tetraethylene glycol-2,2'-azobisisobutyrate); 1,4-bis(pentaethylene)-2-tetrazene; 1,4-dimethoxycarbonyl-1,4-dipheny-1-2-tetrazene and the like; and mixtures thereof.

More typical free radical initiators include, but are not limited to, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate and the like.

Based on total weight of the monomers to be polymerized, the initiator may be present in an amount from about 0.1% to about 5%, from about 0.4% to about 4%, from about 0.5% to about 3%, although may be present in greater or lesser amounts.

A chain transfer agent optionally may be used to control the polymerization degree of the latex, and thereby control the molecular weight and molecular weight distribution of the product latexes of the latex process and/or the toner process according to the present disclosure. As can be appreciated, a chain transfer agent can become part of the latex polymer.

Chain Transfer Agent

In embodiments, the chain transfer agent has a carbon-sulfur covalent bond. The carbon-sulfur covalent bond has an absorption peak in a wave number region ranging from 500 to 800 $cm^{-1}$ in an infrared absorption spectrum. When the chain transfer agent is incorporated into the latex and the toner made from the latex, the absorption peak may be changed, for example, to a wave number region of 400 to 4,000 $cm^{-1}$.

Exemplary chain transfer agents include, but are not limited to, n-$C_{3-15}$ alkyl mercaptans, such as, n-propylmercaptan, n-butylmercaptan, n-amylmercaptan, n-hexylmercaptan, n-heptylmercaptan, n-octylmercaptan, n-nonylmercaptan, n-decylmercaptan and n-dodecylmercaptan; branched alkylmercaptans, such as, isopropylmercaptan, isobutylmercaptan, s-butylmercaptan, tert-butylmercaptan, cyclohexylmercaptan, tert-hexadecylmercaptan, tert-laurylmercaptan, tert-nonylmercaptan, tert-octylmercaptan and tert-tetradecylmercaptan; aromatic ring-containing mercaptans, such as, allylmercaptan, 3-phenylpropylmercaptan, phenylmercaptan and mercaptotriphenylmethane; and so on. The terms, mercaptan and thiol may be used interchangeably to mean C—SH group.

Examples of such chain transfer agents also include, but are not limited to, dodecanethiol, butanethiol, isooctyl-3-mercaptopropionate, 2-methyl-5-t-butyl-thiophenol, carbon tetrachloride, carbon tetrabromide and the like.

Based on total weight of the monomers to be polymerized, the chain transfer agent may be present in an amount from about 0.1% to about 7%, from about 0.5% to about 6%, from about 1.0% to about 5%, although may be present in greater or lesser amounts.

In embodiments, a branching agent optionally may be included in the first/second monomer composition to control the branching structure of the target latex. Exemplary branching agents include, but are not limited to, decanediol diacrylate (ADOD), trimethylolpropane, pentaerythritol, trimellitic acid, pyromellitic acid and mixtures thereof.

Based on total weight of the monomers to be polymerized, the branching agent may be present in an amount from about 0% to about 2%, from about 0.05% to about 1.0%, from about 0.1% to about 0.8%, although may be present in greater or lesser amounts.

In the latex process and toner process of the disclosure, emulsification may be done by any suitable process, such as, mixing at elevated temperature. For example, the emulsion mixture may be mixed in a homogenizer set at about 200 to about 400 rpm and at a temperature of from about 40° C. to about 80° C. for a period of from about 1 min to about 20 min.

Any type of reactor may be used without restriction. The reactor can include means for stirring the compositions therein, such as, an impeller. A reactor can include at least one impeller. For forming the latex and/or toner, the reactor can be operated throughout the process such that the impellers can operate at an effective mixing rate of about 10 to about 1,000 rpm.

Following completion of the monomer addition, the latex may be permitted to stabilize by maintaining the conditions for a period of time, for example for about 10 to about 300 min, before cooling. Optionally, the latex formed by the above process may be isolated by standard methods known in the art, for example, coagulation, dissolution and precipitation, filtering, washing, drying or the like.

The latex of the present disclosure may be selected for emulsion-aggregation-coalescence processes for forming toners, inks and developers by known methods. The latex of the present disclosure may be melt blended or otherwise mixed with various toner ingredients, such as, a wax dispersion, a coagulant, an optional silica, an optional charge enhancing additive or charge control additive, an optional surfactant, an optional emulsifier, an optional flow additive and the like. Optionally, the latex (e.g. around 40% solids) may be diluted to the desired solids loading (e.g. about 12 to about 15% by weight solids), before formulated in a toner composition.

Based on the total toner weight, the latex may be present in an amount from about 50% to about 100%, from about 60% to about 98%, from about 70% to about 95%, although may be present in greater or lesser amounts. Methods of producing such latex resins may be carried out as described in the disclosure of U.S. Pat. No. 7,524,602, herein incorporated by reference in entirety.

Colorants

Various known suitable colorants, such as dyes, pigments, mixtures of dyes, mixtures of pigments, mixtures of dyes and pigments and the like may be included in the toner. The colorant may be included in the toner in an amount of, for example, about 0.1 to about 35% by weight of the toner, from about 1 to about 15% percent of the toner, from about 3 to about 10% by weight of the toner, although amounts outside those ranges may be utilized.

As examples of suitable colorants, mention may be made of carbon black like REGAL 330®; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, CINQUASIA MAGENTA™ available from E.I. DuPont de Nemours & Company and the like. Colorants that can be selected are black, cyan, magenta, yellow and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19 and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, Anthrathrene Blue, identified in the Color Index as CI-69810, Special Blue X-2137 and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™, and cyan components also may be selected as colorants. Other known colorants can be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

Wax

In addition to the polymer resin, the toners of the present disclosure also may contain a wax, which can be either a single type of wax or a mixture of two or more different waxes. A single wax can be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition.

When included, the wax may be present in an amount of, for example, from about 1 wt % to about 25 wt % of the toner particles, in embodiments, from about 5 wt % to about 20 wt % of the toner particles.

Waxes that may be selected include waxes having, for example, a weight average molecular weight of from about 500 to about 20,000, in embodiments from about 1,000 to about 10,000. Waxes that may be used include, for example, polyolefins, such as, polyethylene, polypropylene and polybutene waxes, such as, commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate, pentaerythritol tetra behenate; ester waxes obtained from higher fatty acid and multivalent alcohol multimers, such as, diethyleneglycol monostearate, dipropyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP6550™ and SUPERSLIP6530™ available from Micro Powder Inc., fluorinated waxes, for example, POLYFLUO190™, POLYFLUO 200™, POLYSILK 19™ and POLYSILK 14™ available from Micro Powder Inc., mixed fluorinated, amide waxes, for example, MICROSPERSION19™ available from Micro Powder Inc., imides, esters, quaternary amines, carboxylic acids or acrylic polymer emulsion, for example JONCRYL 74™, 89™, 130™, 537™ and 538™, all available from SC Johnson Wax, and chlorinated polypropylenes and polyethylenes available from Allied Chemical and Petrolite Corporation and SC Johnson wax, Mixtures and combinations of the foregoing waxes also may be used in embodiments. Waxes may be included as, for example, fuser roll release agents.

Toner Preparation

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller-sized resin particles are aggregated to the appropriate toner particle size and then coalesced to achieve the final toner particle shape and morphology.

In embodiments, toner compositions may be prepared by emulsion-aggregation processes, such as, a process that includes aggregating a mixture of an optional wax and any other desired or required additives, and emulsions including the resins described above, optionally with surfactants, as described above, and then coalescing the aggregate mixture. A mixture may be prepared by adding an optional wax or other materials, which optionally also may be in a dispersion(s) including a surfactant, to the emulsion, which may be a mixture of two or more emulsions containing the resin. The pH of the resulting mixture may be adjusted by an acid (i.e., a pH adjustor) such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute (rpm). Homogenization may be accomplished by any suitable means, including, for example, with an IKA ULTRA TURRAX T50 probe homogenizer.

Following preparation of the above mixture, an aggregating agent may be added to the mixture. Suitable aggregating agents include, for example, aqueous solutions of a divalent cation or a multivalent cation material. The aggregating agent may be, for example, polyaluminum halides, such as, polyaluminum chloride (PAC), or the corresponding bromide, fluoride or iodide, polyaluminum silicates, such as, polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature ($T_g$) of the resin.

The aggregating agent may be added to the mixture to form a toner in an amount of, for example, from about 0.1 parts per hundred (pph) to about 1 pph, in embodiments, from about 0.25 pph to about 0.75 pph.

The gloss of a toner may be influenced by the amount of retained metal ion, such as, $Al^{3+}$, in the particle. The amount of retained metal ion may be adjusted further by the addition of ethylene diamine tetraacetic acid (EDTA). In embodiments, the amount of retained metal ion, for example, $Al^{3+}$, in toner particles of the present disclosure may be from about 0.1 pph to about 1 pph, in embodiments, from about 0.25 pph to about 0.8 pph.

The disclosure also provides a melt mixing process to produce low cost and safe cross-linked thermoplastic binder resins for toner compositions which have, for example, low fix temperature and/or high offset temperature, and which may show minimized or substantially no vinyl offset. In the process, unsaturated base polyester, resins or polymers are melt blended, that is, in the molten state under high shear conditions producing substantially uniformly dispersed toner constituents, and which process provides a resin blend and toner product with optimized gloss properties (see, e.g., U.S. Pat. No. 5,556,732, herein incorporated by reference in entirety). By, "highly cross-linked," is meant that the polymer involved is substantially cross-linked, that is, equal to or above the gel point. As used herein, "gel point," means the point where the polymer is no longer soluble in solution (see, e.g., U.S. Pat. No. 4,457,998, herein incorporated by reference in entirety).

To control aggregation and coalescence of the particles, in embodiments, the aggregating agent may be metered into the mixture over time. For example, the agent may be metered into the mixture over a period of from about 5 to about 240 min, in embodiments, from about 30 to about 200 min. Addition of the agent may also be done while the mixture is maintained under stirred conditions, in embodiments from about 50 rpm to about 1,000 rpm, in embodiments, from about 100 rpm to about 500 rpm, and at a temperature that is below the $T_g$ of the resin.

The particles may be permitted to aggregate until a predetermined desired particle size is obtained. A predetermined desired size refers to the desired particle size as determined prior to formation, with particle size monitored during the growth process as known in the art until such particle size is achieved. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at that temperature for a time from about 0.5 hr to about 6 hr, in embodiments, from about 1 hr to about 5 hr, while maintaining stirring, to provide the aggregated particles. Once the predetermined desired particle size is obtained, the growth process is halted. In embodiments, the predetermined desired particle size is within the toner particle size ranges mentioned above. In embodiments, the particle size may be about 5.0 to about 6.0 µm, about 6.0 to about 6.5 µm, about 6.5 to about 7.0 µm, about 7.0 to about 7.5 µm.

Growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example from about 40° C. to about 90° C., in embodiments, from about 45° C. to about 80° C., which may be below the $T_g$ of the resin.

Toners may possess favorable charging characteristics when exposed to extreme RH conditions, The low humidity zone (C zone) may be about 12° C./15% RH, while the high humidity zone (A zone) may be about 28° C./85% RH. Toners of the disclosure may possess a parent toner charge per mass ratio (Q/M) of from about −5 µC/g to about −80 µC/g, in embodiments, from about −10 µC/g to about −70 µC/g, and a final toner charging after surface additive blending of from −15 µC/g to about −60 µC/g, in embodiments, from about −20 µC/g to about −55 µC/g.

Shell Resin

In embodiments, a shell, may be applied to the formed aggregated toner particles. Any resin described above as suitable for the core resin may be utilized as the shell resin. The shell resin may be applied to the aggregated particles by any method within the purview of those skilled in the art. In embodiments, the shell resin may be in an emulsion including any surfactant described herein. The aggregated particles described above may be combined with said emulsion so that the resin forms a shell over the formed aggregates. In embodiments, an amorphous polyester may be utilized to form a shell over the aggregates to form toner particles having a core-shell configuration.

Toner particles can have a size of diameter of from about 4 to about 8 µm, in embodiments, from about 5 to about 7 µm, the optimal shell component may be about 26 to about 30% by weight of the toner particles.

Alternatively, a thicker shell may be desirable to provide desirable charging characteristics due to the higher surface area of the toner particle. Thus, the shell resin may be present in an amount from about 30% to about 40% by weight of the toner particles, in embodiments, from about 32% to about 38% by weight of the toner particles, in embodiments, from about 34% to about 36% by weight of the toner particles.

In embodiments, a photoinitiator may be included in the shell. Thus, the photoinitiator may be in the core, the shell, or both. The photoinitiator may be present in an amount of from about 1% to about 5% by weight of the toner particles, in embodiments, from about 2% to about 4% by weight of the toner particles.

Emulsions may have a solids loading of from about 5% solids by weight to about 20% solids by weight, in embodiments, from about 12% solids by weight to about 17% solids by weight.

Once the desired final size of the toner particles is achieved, the pH of the mixture may be adjusted with a base (i.e., a pH adjustor) to a value of from about 6 to about 10, and in embodiments from about 6.2 to about 7. The adjustment of the pH may be utilized to freeze, that is to stop, toner growth. The base utilized to stop toner growth may include any suitable base, such as, for example, alkali metal hydroxides, such as, for example, sodium hydroxide, potassium hydroxide, ammonium hydroxide, combinations thereof and the like. In embodiments, EDTA may be added to help adjust the pH to the desired values noted above. The base may be added in amounts from about 2 to about 25% by weight of the mixture, in embodiments, from about 4 to about 10% by weight of the mixture. In embodiments, the shell has a higher $T_g$ than the aggregated toner particles.

Coalescence

Following aggregation to the desired particle size, with the optional formation of a shell as described above, the particles then may be coalesced to the desired final shape, the coalescence being achieved by, for example, heating the mixture to a temperature of from about 55° C. to about 100° C., in embodiments from about 65° C. to about 75° C., which may be below the melting point of a crystalline resin to prevent plasticization. Higher or lower temperatures may be used, it being understood that the temperature is a function of the resins used.

Coalescence may proceed over a period of from about 0.1 to about 9 hr, in embodiments, from about 0.5 to about 4 hr.

After coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method, for example, freeze drying.

Carriers

Various suitable solid core or particle materials can be utilized for the carriers and developers of the present disclosure. Characteristic particle properties include those that, in embodiments, will enable the toner particles to acquire a positive charge or a negative charge, and carrier cores that provide desirable flow properties in the developer reservoir present in an electrophotographic imaging apparatus. Other desirable properties of the core include, for example, suitable magnetic characteristics that permit magnetic brush formation in magnetic brush development processes; desirable mechanical aging characteristics; and desirable surface morphology to permit high electrical conductivity of any developer including the carrier and a suitable toner.

Examples of carrier particles or cores that can be utilized include iron and/or steel, such as, atomized iron or steel powders available from Hoeganaes Corporation or Pomaton S.p.A (Italy); ferrites, such as, Cu/Zn-ferrite containing, for example, about 11% copper oxide, about 19% zinc oxide, and about 70% iron oxide, including those commercially available from D.M. Steward Corporation or Powdertech Corporation, Ni/Zn-ferrite available from Powdertech Corporation, Sr (strontium)-ferrite, containing, for example, about 14% strontium oxide and about 86% iron oxide, commercially available from Powdertech Corporation, and Ba-ferrite; magnetites, including those commercially available from, for example, Hoeganaes Corporation (Sweden); nickel; combinations thereof, and the like. In embodiments, the polymer particles obtained can be used to coat carrier cores of any known type by various known methods, and which carriers then are incorporated with a known toner to form a developer for electrophotographic printing. Other suitable carrier cores are illustrated in, for example, U.S. Pat. Nos. 4,937,166, 4,935,326 and 7,014,971, the disclosure of each of which hereby is incorporated by reference in entirety, and may include granular zircon, granular silicon, glass, silicon dioxide, combinations thereof, and the like. In embodiments, suitable carrier cores may have an average particle size of, for example, from about 20 μm to about 400 μm in diameter, in embodiments, from about 40 μm to about 200 μm in diameter.

In embodiments, a ferrite may be utilized as the core, including a metal, such as, iron and at least one additional metal, such as, copper, zinc, nickel, manganese, magnesium, calcium, lithium, strontium, zirconium, titanium, tantalum, bismuth, sodium, potassium, rubidium, cesium, strontium, barium, yttrium, lanthanum, hafnium, vanadium, niobium, aluminum, gallium, silicon, germamium, antimony, combinations thereof and the like.

In some embodiments, the carrier coating may include a conductive component. Suitable conductive components include, for example, carbon black.

There may be added to the carrier a number of additives, for example, charge enhancing additives, including particulate amine resins, such as, melamine, and certain fluoropolymer powders, such as alkyl-amino acrylates and methacrylates, polyamides, and fluorinated polymers, such as polyvinylidine fluoride and poly(tetrafluoroethylene) and fluoroalkyl methacrylates, such as 2,2,2-trifluoroethyl methacrylate. Other charge enhancing additives which may be utilized include quaternary ammonium salts, including distearyl dimethyl ammonium methyl sulfate (DDAMS), bis[1-[(3,5-disubstituted-2-hydroxyphenyl)azo]-3-(mono-substituted)-2-naphthalenolato(2-)]chromate(1-), ammonium sodium and hydrogen (TRH), cetyl pyridinium chloride (CPC), FANAL PINK® D4830, combinations thereof, and the like, and other effective known charge agents or additives. The charge additive components may be selected in various effective amounts, such as from about 0.5 wt % to about 20 wt %, from about 1 wt % to about 3 wt %, based, for example, on the sum of the weights of polymer/copolymer, conductive component, and other charge additive components. The addition of conductive components can act to further increase the negative triboelectric charge imparted to the carrier, and therefore, further increase the negative triboelectric charge imparted to the toner in, for example, an electrophotographic development subsystem. The components may be included by roll mixing, tumbling, milling, shaking, electrostatic powder cloud spraying, fluidized bed, electrostatic disc processing, and an electrostatic curtain, as described, for example, in U.S. Pat. No. 6,042,981, the disclosure of which hereby is incorporated by reference in entirety, and wherein the carrier coating is fused to the carrier core in either a rotary kiln or by passing through a heated extruder apparatus.

Conductivity can be important for semiconductive magnetic brush development to enable good development of solid areas which otherwise may be weakly developed. Addition of a polymeric coating of the present disclosure, optionally with a conductive component such as carbon black, can result in carriers with decreased developer triboelectric response with change in relative humidity of from about 20% to about 90%, in embodiments, from about 40% to about 80%, that the charge is more consistent when the relative humidity is changed. Thus, there is less decrease in charge at high relative humidity reducing background toner on the prints, and less increase in charge and subsequently less loss of development at low relative humidity, resulting in such improved image quality performance due to improved optical density.

As noted above, in embodiments the polymeric coating may be dried, after which time it may be applied to the core carrier as a dry powder. Powder coating processes differ from conventional solution coating processes. Solution coating requires a coating polymer whose composition and molecular weight properties enable the resin to be soluble in a solvent in the coating process. That requires relatively low $M_w$ components as compared to powder coating. The powder coating process does not require solvent solubility, but does require the resin coated as a particulate with a particle size of from about 10 nm to about 2 µm, in embodiments, from about 30 nm to about 1 µm, in embodiments, from about 50 nm to about 500 nm.

Examples of processes which may be utilized to apply the powder coating include, for example, combining the carrier core material and resin coating by cascade roll mixing, tumbling, milling, shaking, electrostatic powder cloud spraying, fluidized bed, electrostatic disc processing, electrostatic curtains, combinations thereof and the like. When resin coated carrier particles are prepared by a powder coating process, the majority of the coating materials may be fused to the carrier surface, thereby reducing the number of toner impaction sites on the carrier. Fusing of the polymeric coating may occur by mechanical impaction, electrostatic attraction, combinations thereof and the like.

Following application of the resin to the core, heating may be initiated to permit flow of the coating material over the surface of the carrier core. The concentration of the coating material, in embodiments, powder particles, and the parameters of the heating may be selected to enable the formation of a continuous film of the coating polymers on the surface of the carrier core, or permit only selected areas of the carrier core to be coated. In embodiments, the carrier with the polymeric powder coating may be heated to a temperature of from about 170° C. to about 280° C., in embodiments from about 190° C. to about 240° C., for a period of time of, for example, from about 10 min to about 180 min, in embodiments, from about 15 min to about 60 min, to enable the polymer coating to melt and to fuse to the carrier core particles. Following incorporation of the powder on the surface of the carrier, heating may be initiated to permit flow of the coating material over the surface of the carrier core. In embodiments, the powder may be fused to the carrier core in either a rotary kiln or by passing through a heated extruder apparatus, see, for example, U.S. Pat. No. 6,355,391, the disclosure of which hereby is incorporated by reference in entirety.

In embodiments, the coating coverage encompasses from about 10% to about 100% of the carrier core. When selected areas of the metal carrier core remain uncoated or exposed, the carrier particles may possess electrically conductive properties when the core material is a metal, The coated carrier particles may then be cooled, in embodiments to room temperature, and recovered for use in forming developer.

In embodiments, carriers of the present disclosure may include a core, in embodiments, a ferrite core, having a size of from about 20 µm to about 100 µm, in embodiments, from about 30 µm to about 75 µm, coated with from about 0.5% to about 10% by weight, in embodiments, from about 0.7% to about 5% by weight, of the polymer coating of the present disclosure, optionally including carbon black.

Thus, with the carrier compositions and processes of the present disclosure, there can be formulated developers with selected high triboelectric charging characteristics and/or conductivity values utilizing a number of different combinations.

Developers

The toner particles thus formed may be formulated into a developer composition. The toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer.

Imaging

The toners can be utilized for electrophotographic processes, including those disclosed in U.S. Pat. No. 4,295,990, the disclosure of which is hereby incorporated by reference in entirety. In embodiments, any known type of image development system may be used in an image developing device, including, for example, magnetic brush development, hybrid scavengeless development (HSD) and the like. Those and similar development systems are within the purview of those skilled in the art.

It is envisioned that the toners of the present disclosure may be used in any suitable procedure for forming an image with a toner, including in applications other than xerographic applications.

Utilizing the toners of the present disclosure, images may be formed on substrates, including flexible substrates, having a toner pile height of from about 1;AM to about 6 µm, in embodiments, from about 2 µm to about 4.5 µm, in embodiments, from about 2.5 to about 4.2 µm.

In embodiments, the toner of the present disclosure may be used for a xerographic print protective composition that provides overprint coating properties including, but not limited to, thermal and light stability and smear resistance, particularly in commercial print applications. More specifically, such overprint coating as envisioned has the ability to permit overwriting, reduce or prevent thermal cracking, improve fusing, reduce or prevent document offset, improve print performance and protect an image from sun, heat and the like. In embodiments, the overprint compositions may be used to improve the overall appearance of xerographic prints due to the ability of the compositions to fill in the roughness of xerographic substrates and toners, thereby forming a level film and enhancing glossiness.

The following Examples are submitted to illustrate embodiments of the disclosure. The Examples are intended to be illustrative only and are not intended to limit the scope of the disclosure. Also, parts and percentages are by weight unless otherwise indicated. As used herein, "room temperature," refers to a temperature of from about 20° C. to about 30° C.

EXAMPLES

The examples set forth herein below are being submitted to illustrate embodiments of the present disclosure. These examples are intended to be illustrative only and are not intended to limit the scope of the present disclosure. Also, parts and percentages are by weight unless otherwise indicated. Comparative examples and data are also provided.

Example 1

Synthesis and Characterization of Silica Nanotubes

Synthesis of silica nanotubes have been reported in Chuanbo Gao et al., Gram-Scale Synthesis of Silica Nanotubes with Controlled Aspect Ratios by Templating of Nickel-Hydrazine Complex Nanorods, Langmuir, 27: 12201-12208 (2011), which is hereby incorporated by reference in its entirety.

A prophetic example of silica nanotubes synthesis is further provided as follows. Silica nanotubes with various aspect ratios can be synthesized on a large scale by templating against rod-like nanocrystals. For example, crystalline nanorods of a nickel-hydrazine complex can be formed in reverse micelles by surfactant capping on side facets, and subsequent silica coating and selective etching can give rise to silica nanotubes of high uniformity and yield. The length of the silica nanotubes can be tuned in the range 37 to 340 nm and can reach as long as micrometers. Control of the length can be achieved by tuning the nickel/hydrazine ratio. The inner diameter of the silica nanotubes can be adjusted in the range 10 to 20 nm by choosing different surfactants.

The length and inner diameter of the silica nanotubes can be characterized via high-magnification TEM analysis performed with a Philips Tecnai 12 transmission electron microscope operating at 120 kV.

Example 2

Toner and Developer Preparation

A prophetic example of an additive package utilizing SiNT is shown in Table 1 below.

TABLE 1

| Component | Wt % |
| --- | --- |
| Parent Particle | 94.28% |
| RX50 | 0.86% |
| RY50L | 1.29% |
| STT100H | 0.88% |
| Silica Nanotubes | 1.73% |
| ZnSt Fine Powder | 0.18% |
| PMMA | 0.50% |
| CeO2 | 0.28% |

Toners can be blended in a 10 liter Henschel mixer for about 5 minutes at about 2640 rpm. Developers can be prepared with Xerox 700 carrier at 8% toner concentration. Toners and carriers can be weighed out to a total of about 450 grams of developer in a 1 liter glass jar. The glass jar can be sealed and mixed for 10 minutes on a Turbula mixer. These toners and developers then can be used in a Xerox 700 machine for printing.

Characterization of Developer Charge

Developers can be prepared by adding 0.5 grams toner to 10 grams of Xerox 700 carrier. A duplicate developer sample pair can be prepared for each toner evaluated. One developer of the pair can be conditioned overnight in A-zone (28° C./85% RH), and the other can be conditioned overnight in the C-zone (10° C./15% RH). The next day, the developer samples can be sealed and agitated for about 2 minutes and then for about 1 hour using a Turbula mixer. After mixing, the triboelectric charge of the toner can be measured using a charge spectrograph with a 100 V/cm field. The toner charge (q/d) can be measured visually as the midpoint of the toner charge distribution. The charge can be reported in millimeters of displacement from the zero line (mm displacement can be converted to femtocoulombs/micron (fC/μm) by multiplying by 0.092).

Following about 1 hour of mixing, an additional 0.5 grams of toner can be added to the already charged developer, and mixed for an additional 15 seconds, where a q/d displacement can be measured again, and then mixed for an additional 45 seconds (total 1 minute of mixing), and again a q/d displacement can be measured. This procedure will measure the toner admix.

The Q/M can also be measured by the total blow-off method, a method primarily used for the measurement of dual component toner, which is in the purview of those skilled in the art. In the blow-off method, the particles are first deposited, and then blown off using an air stream to characterize triboelectric properties of particles relative to different surfaces It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims.

Unless specifically recited in a claim, steps or components of claims should not be implied or imported from the specification or any other claims as to any particular order, number, position, size, shape, angle, color or material.

All references cited herein are herein incorporated by reference in their entireties.

What is claimed is:

1. A toner composition comprising:
   toner particles comprising a resin and a colorant; and
   one or more surface additives applied to a surface of the toner particles, the one or more surface additives comprising silica nanotubes.

2. The toner composition of claim 1, wherein the one or more surface additives further comprise a particulate silica, particulate titania, particulate alumina and mixtures thereof.

3. The toner composition of claim 2, wherein the particulate titania has an anatase or rutile structure.

4. The toner composition of claim 2, wherein the silica nanotubes are present in an amount of from about 0.1 to about 5 percent by weight of the total weight of the toner composition.

5. The toner composition of claim 2, wherein the particulate silica, particulate titania, particulate alumina and mixtures thereof are present in an amount of from about 0.1 to about 5 percent by weight of the total weight of the toner composition.

6. The toner composition of claim 1, wherein the silica nanotubes are present in an amount of from about 0.1 to about 5 percent by weight of the total weight of the toner composition.

7. The toner composition of claim 1 further comprising one or more photoreceptor cleaning additives, where the one or more surface additives further comprise a particulate cerium dioxide, a fluoropolymer, a particulate comprised of a fluoropolymer, a particulate comprised of polytetrafluoroethylene, a particulate comprised of a polymethylmethacrylate, a particulate comprised of a metal stearate, a particulate comprised of zinc stearate, aluminum stearate or calcium stearate and mixtures thereof.

8. The toner composition of claim 1, wherein the silica nanotubes have an average particle diameter of from about from about 5 nm to about 100 nm.

9. The toner composition of claim 8, wherein the silica nanotubes have an average particle diameter of from about from about 5 nm to about 50 nm.

10. The toner composition of claim 1, wherein the silica nanotubes have an average particle length of from about from about 50 nm to about 2 microns.

11. The toner composition of claim 10, wherein the silica nanotubes have an average particle length of from about from about 100 nm to about 1 microns.

12. The toner composition of claim 1, wherein the surface of the silica nanotubes is substantially free of hydroxyl groups.

13. The toner composition of claim 1, wherein the silica nanotubes comprise silicon.

14. The toner composition of claim 1 having a percent toner cohesion from about 10% to about 78%.

15. The toner composition of claim 1 having an Additive Adhesion Force Distribution percent value of greater than 40 percent after from about 2.5 to about 3 minutes of sonification and 3 kilojoules of energy.

16. A toner composition comprising:
   toner particles comprising a resin and a colorant; and
   one or more surface additives applied to a surface of the toner particles, the one or more surface additives comprising silica nanotubes, wherein the toner composition has a high charge of from about −15 microcoulomb per gram to about −80 microcoulomb per gram and a low relative humidity sensitivity ratio of from about 1 to about 2.

17. The toner composition of claim 16, wherein the silica nanotubes have an average particle diameter of from about from about 5 nm to about 100 nm and an average particle length of from about from about 50 nm to about 2 microns.

18. A developer comprising:
   a toner composition; and
   a toner carrier, wherein the toner composition comprises
      toner particles comprising a resin and a colorant, and
      one or more surface additives applied to a surface of the toner particles, the one or more surface additives comprising silica nanotubes.

19. The developer of claim 18, wherein the toner composition is an emulsion aggregation toner composition.

20. The developer of claim 18, wherein the toner composition is prepared by physical methods.

* * * * *